United States Patent
Myrick

(10) Patent No.: US 6,481,111 B1
(45) Date of Patent: Nov. 19, 2002

(54) SPIRIT LEVEL FOR TILE AND CABINET INSTALLATION

(75) Inventor: Charles Myrick, Duarte, CA (US)

(73) Assignee: Ronald S. Pole, Inglewood, CA (US)

( * ) Notice: Subject to any disclaimer, the term of this patent is extended or adjusted under 35 U.S.C. 154(b) by 0 days.

(21) Appl. No.: 09/684,901

(22) Filed: Oct. 10, 2000

(51) Int. Cl.$^7$ .............................................. G01C 9/18
(52) U.S. Cl. ........................................ 33/526; 33/613
(58) Field of Search ..................... 33/376, 451, 452, 33/478, 492, 526, 527, 613, 645, 374, 375, 484, 485

(56) References Cited

U.S. PATENT DOCUMENTS

| | | | |
|---|---|---|---|
| 330,124 A | * 11/1885 | Jewell ........................... | 33/485 |
| 3,744,141 A | * 7/1973 | Strickland, Sr. ............. | 33/180 |
| 4,435,908 A | * 3/1984 | Semler, Jr. .................... | 33/376 |
| 4,782,597 A | * 11/1988 | Mills ............................. | 33/370 |
| 4,928,395 A | * 5/1990 | Good ............................ | 33/374 |
| 4,970,796 A | * 11/1990 | Masters et al. ............... | 33/347 |
| 5,263,260 A | * 11/1993 | Smith ........................... | 33/526 |
| 5,398,423 A | * 3/1995 | Smith ........................... | 33/526 |
| 5,927,675 A | * 7/1999 | Kratish et al. ................ | 248/466 |
| 6,041,510 A | * 3/2000 | Huff .............................. | 33/374 |
| 6,173,503 B1 | * 1/2001 | Houghton et al. ............ | 33/454 |
| 6,279,240 B1 | * 8/2001 | Bonaventura, Jr. ........... | 33/374 |

* cited by examiner

Primary Examiner—Diego Gutierrez
Assistant Examiner—Tania Courson
(74) Attorney, Agent, or Firm—David A. Belasco; Belasco Jacobs & Townsley, LLP

(57) ABSTRACT

A spirit level for the installation of tile and cabinets includes a rigid body having upper and lower parallel planar surfaces separated by a first predetermined width. The body includes a bubble vial oriented to verify the horizontal orientation of the level. An auxiliary edge portion has a planar top surface and a planar bottom surface parallel to the top surface separated by a second predetermined width. Means, such as a tongue and groove or hole and pin arrangement are provided for removably attaching the auxiliary edge portion to the upper planar surface of the rigid body, thereby providing a level having two standard widths corresponding to industry standard tiles. A series of evenly spaced holes are provided for removably securing the rigid body to a flat surface. An additional bubble vial is fixedly attached to the rigid body for indicating when the upper and lower planar surfaces are vertically oriented. The first and second ends of the rigid body include parallel planar end surfaces normal to the upper and lower planar surfaces. A series of frictional pads are fixedly attached to the back surface of the body and serve to facilitate positioning the level on the flat surface.

8 Claims, 3 Drawing Sheets

SPIRIT LEVEL FOR TILE AND CABINET INSTALLATION

FIELD OF INVENTION

The invention pertains to leveling devices. More particularly, the invention relates to devices for accurately orienting tile and cabinet installations.

BACKGROUND OF THE INVENTION

Various inventions have been developed for installing and properly orienting tile, cabinets and other wall mounted devices. U.S. Pat. No. 4,443,949 issued to Newton is directed to a template having an array of closely spaced holes at each end and a spirit level in the center for use in level hanging of wall supported objects. The template has an elongated and relatively thin stick-like body and has two symmetrical arrays of closely spaced holes with visible indicia imprinted on the front face of the template such as alphanumeric code letters and numerals to identify corresponding pairs of holes in the arrays.

U.S. Pat. No. 4,435,908 issued to Semler, Jr., discloses a leveling apparatus that is stored in compact form and can be extended up to three times its length. The plumbing device includes a standard carpenter's level with three vials to indicate level in the vertical or horizontal direction as typical of a carpenter's level. A left extension member and a right extension member slidably engage the opposed flat surfaces of flanges of the level. One or more quick release mechanisms are provided to lock each of the extension members to the carpenter's level. The mechanisms allow easy extension of the members as desired.

U.S. Pat. No. 4,970,796, issued to Masters et al. is directed to a self-supporting spirit level tool allowing hands-free indication by means of retractable nail-like pins, elastic cords or magnets. The level, plumb and grading tool, comprise an elongate tool with the handle region, and arms. Bullseye type vials are located at each end of the handle region for establishing vertical alignment of structure members. A pair of additional spirit level vials is secured to each arm to indicate a level or horizontal orientation. Means for securing the tool in place is by penetration of nail-like fastener or pins into the object against which the tool is abutted. Securing means for temporarily holding the fastening tool include a pair of elastic cords. The third means for temporarily fastening the tool are flat magnets embedded in the inner surface of each angled member.

U.S. Pat. No. 4,168,578 issued to VanderWerf describes a four-way corner level that has four leveling indicators that each provides a vertical and horizontal indication. The corner level adapted for use on a variety of structures and objects in either the horizontal or vertical plane has two right angle external sides, each provided with two level means that includes a T-shaped case with spirit levels positioned at right angles to each other and parallel to their respective leveling outside edge. Six apertures are provided for the operator to attach the instrument with nails or the like to a surface, freeing the use of the operator's hands.

U.S. Pat. No. 4,782,597 issued to Mills is directed to a level-indicating device with nail guiding means for tacking the level onto a surface. The leveling device, an otherwise typical carpenter's level, has three conventional bubble assemblies for indicating level. A nail guiding means is installed on either end of the level allowing the operator to drive the nailing means into the surface being leveled, freeing the operator's hands.

While other variations exist, the above-described inventions for installing tile, cabinets or other devices are typical of those encountered in the prior art. It is an objective of the present invention to provide means for installing tile, cabinets or similar devices in a level fashion. It is a further objective to provide a level starting course for tiles of at least two industry standard dimensions. It is a still further objective of the invention to provide a means to temporarily secure the invention to a vertical surface, thus freeing the hands of a user. It is yet a further objective to provide a leveling device for tile, cabinets, and other items that is rugged and durable yet inexpensive to manufacture.

While some of the objectives of the present invention are disclosed in the prior art, none of the inventions found include all of the requirements identified.

SUMMARY OF THE INVENTION

The present invention addresses all of the deficiencies of prior art leveling inventions for tile and cabinet installation and satisfies all of the objectives described above.

A level for tile and cabinet installation providing the desired features may be constructed from the following components. A rigid body is provided. The body has a planar upper surface, a planar lower surface parallel to the upper surface, a first end, a second end, a front surface, a back surface and a first predetermined length. The upper and lower planar surfaces are separated by a first predetermined width.

An auxiliary edge portion is provided. The edge portion has a planar top surface and a planar bottom surface parallel to the top surface. The top and bottom planar surfaces are separated by a second predetermined width. Means are provided for removably attaching the auxiliary edge portion to the upper planar surface of the rigid body.

At least one bubble vial is provided. The vial is fixedly attached to the rigid body for indicating when the upper and lower planar surfaces are horizontally oriented. Means are provided for removably securing the rigid body to a flat surface.

In a variant of the invention, the means for removably attaching the auxiliary edge portion to the upper planar surface of the rigid body further includes a groove formed in the upper surface of the rigid body. A mating tongue portion extends downwardly from bottom surface of the auxiliary edge portion and is sized, shaped, and located to removably engage the groove. When so engaged, the top surface of the auxiliary edge portion will be parallel to upper surface of the rigid body and the level will have a width equal to the sum of the first predetermined width and the second predetermined width.

In a further variation, the means for removably attaching the auxiliary edge portion to the upper planar surface of the rigid body includes at least one pin. The pin extends downwardly from the bottom surface of the auxiliary edge portion. At least one mating orifice is provided. The orifice penetrates the upper surface of the rigid body and is sized, shaped, and located to removably engage the pin. When so engaged the top surface of the auxiliary edge portion will be parallel to upper surface of the rigid body and the level will have a width equal to the sum of the first predetermined width and the second predetermined width.

In still a further variant of the invention, at least one bubble vial is fixedly attached to the rigid body for indicating when the upper and lower planar surfaces are vertically oriented.

In another variant, the first end and second end include parallel planar end surfaces normal to the upper and lower planar surfaces.

In still another variant, the means for removably securing the rigid body to a flat surface includes a series of holes that penetrate the rigid body perpendicular to a long axis of the level and at least two nails or screws. The nails or screws are of sufficient length to pass though the holes in the rigid body and to secure the rigid body to the flat surface.

In still a further variant, the series of holes is evenly spaced along the rigid body to facilitate removably attaching the level to supporting structures located behind the flat surface.

In a final variant, a series of frictional pads are fixedly attached to the back surface of the body and serve to facilitate positioning the level on the flat surface.

DETAILED DESCRIPTION OF THE PREFERRED EMBODIMENT

Figure 1:
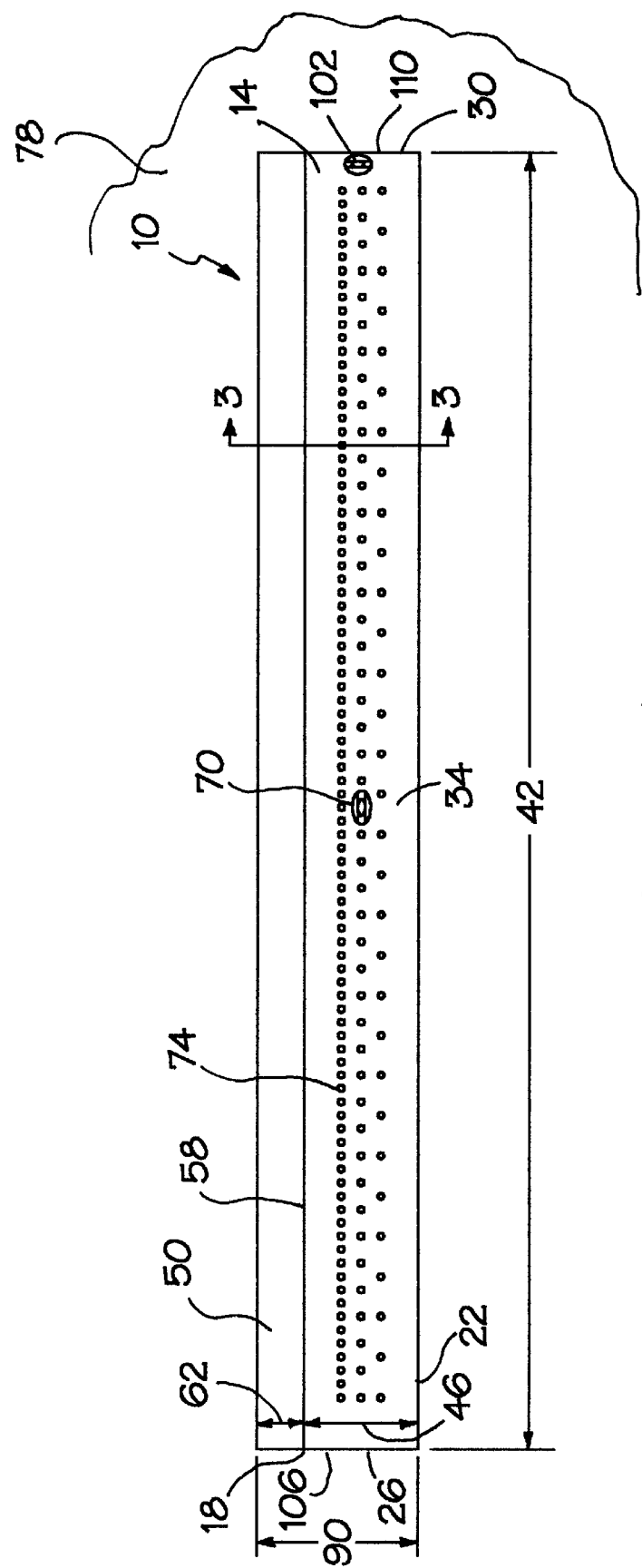
FIG. 1 is a side elevational view of the preferred embodiment of the invention illustrating attaching holes and bubble vials.
Figure 2:
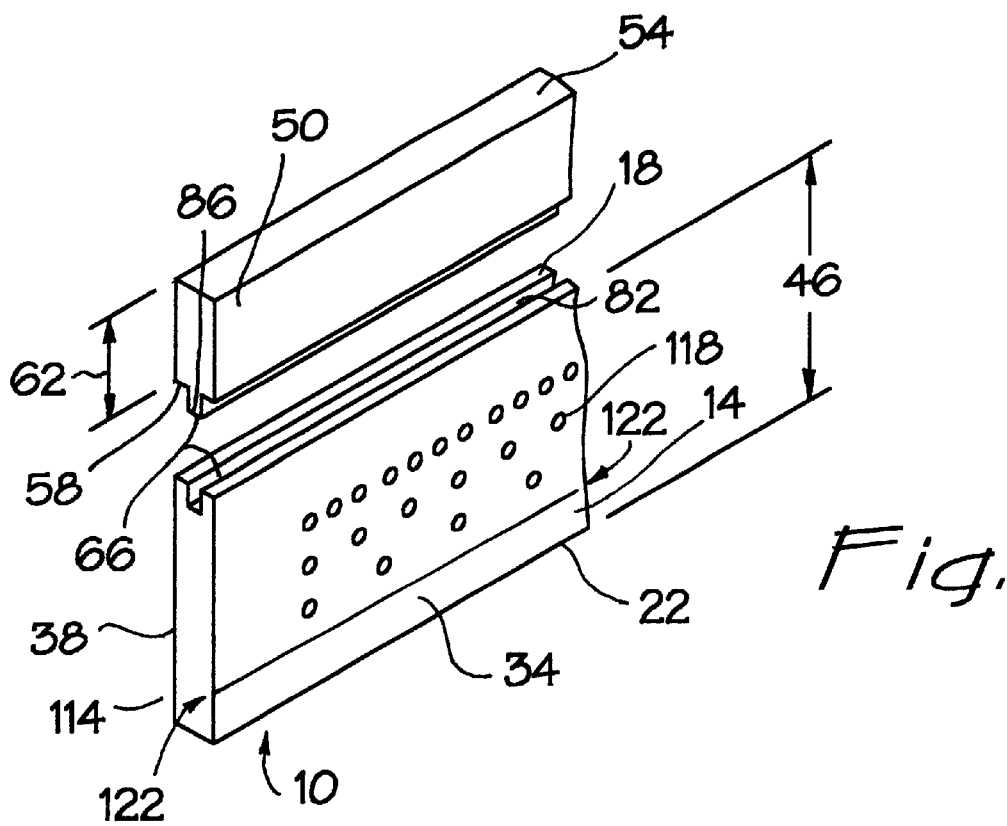
FIG. 2 is a partial perspective view of the FIG. 1 embodiment illustrating the preferred attachment of the auxiliary edge portion.

As illustrated in FIGS. 1 and 2, a level for tile and cabinet installation 10 providing the desired features may be constructed from the following components. A rigid body 14 is provided. The body 14 has a planar upper surface 18, a planar lower surface 22 parallel to the upper surface 18, a first end 26, a second end 30, a front surface 34, a back surface 38 and a first predetermined length 42. The upper 18 and lower 22 planar surfaces are separated by a first predetermined width 46.

As illustrated in FIG. 2, an auxiliary edge portion 50 is provided. The edge portion 50 has a planar top surface 54 and a planar bottom surface 58 parallel to the top surface 54. The top 54 and bottom 58 planar surfaces are separated by a second predetermined width 62. Means 66 are provided for removably attaching the auxiliary edge portion 50 to the upper planar surface 18 of the rigid body 14.

As shown in FIG. 1, at least one bubble vial 70 is provided. The vial 70 is fixedly attached to the rigid body 14 for indicating when the upper 18 and lower 22 planar surfaces are horizontally oriented. Means 74 are provided for removably securing the rigid body 14 to a flat surface 78.

In a variant of the invention, illustrated in FIG. 2, the means 66 for removably attaching the auxiliary edge portion 50 to the upper planar surface 18 of the rigid body 14 further includes a groove 82 formed in the upper surface 18 of the rigid body 14. A mating tongue portion 86 extends downwardly from bottom surface 58 of the auxiliary edge portion 50 and is sized, shaped, and located to removably engage the groove 82. When so engaged, the top surface 54 of the auxiliary edge portion 50 will be parallel to upper surface 18 of the rigid body 14 and the level 10 will have a width 90 equal to the sum of the first predetermined width 46 and the second predetermined width 62.

Figure 4:
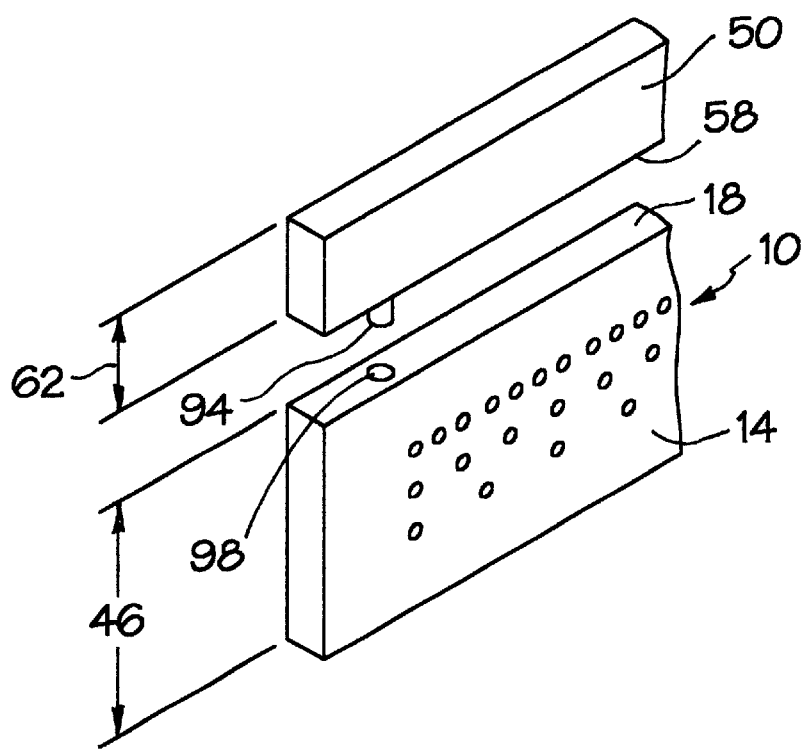
FIG. 4 is a partial perspective view of the FIG. 1 embodiment illustrating a second attachment means for the auxiliary edge portion.

In a further variation, illustrated in FIG. 4, the means 66 for removably attaching the auxiliary edge portion 50 to the upper planar surface 18 of the rigid body 14 includes a least one pin 94. The pin 94 extends downwardly from the bottom surface 58 of the auxiliary edge portion 50. At least one mating orifice 98 is provided. The orifice 98 penetrates the upper surface 18 of the rigid body 14 and is sized, shaped, and located to removably engage the pin 94. When so engaged the top surface 54 of the auxiliary edge portion 50 will be parallel to upper surface 18 of the rigid body 14 and the level 10 will have a width 90 equal to the sum of the first predetermined width 46 and the second predetermined width 62.

In still a further variant of the invention, illustrated in FIG. 1, at least one bubble vial 102 is fixedly attached to the rigid body 14 for indicating when the upper 18 and lower 22 planar surfaces are vertically oriented.

In another variant, illustrated in FIG. 1, the first end 26 and second end 30 include parallel planar end surfaces 106, 110 normal to the upper 18 and lower 22 planar surfaces.

Figure 3:
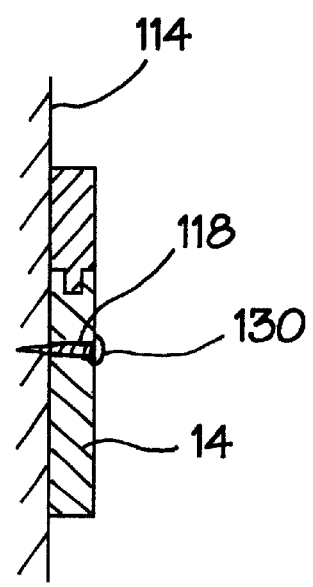
FIG. 3 is a cross-sectional view of the FIG. 1 embodiment taken along the line 3—3.

In still another variant, illustrated in FIGS. 2 and 3, the means for removably securing the rigid body 14 to a flat surface 114 includes a series of holes 118 that penetrate the rigid body 14 perpendicular to a long axis 122 of the level 10 and at least two nails (not shown) or screws 130. The nails or screws 130 are of sufficient length to pass though the holes 118 in the rigid body 14 and to secure the rigid body 14 to the flat surface 114.

In still a further variant, illustrated in FIGS. 1 and 3, the series of holes 118 is evenly spaced along the rigid body 14 to facilitate removably attaching the level 10 to the flat surfaces 114.

Figure 5:
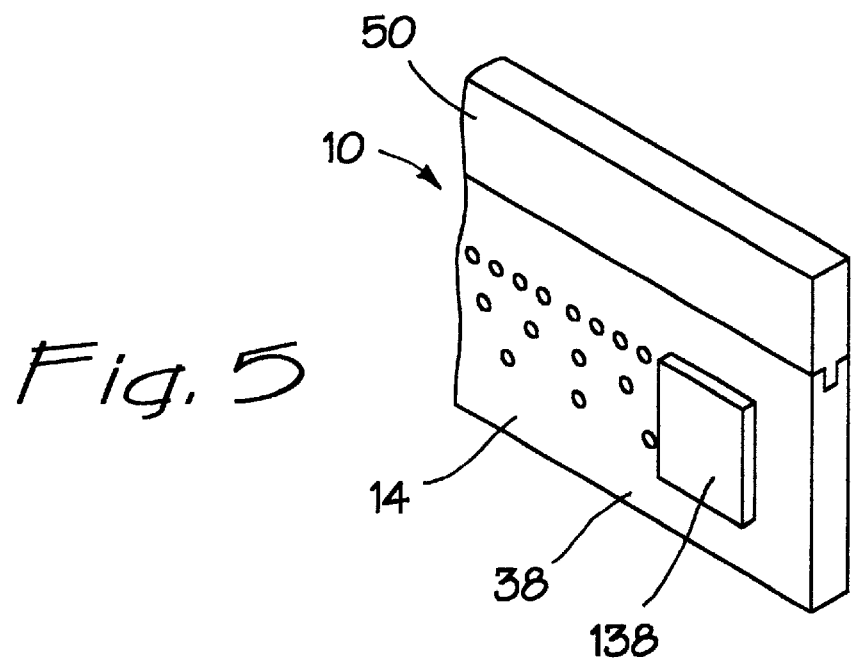
FIG. 5 a partial perspective view of the FIG. 1 embodiment illustrating a frictional pad attached to the back surface of the body.

In a final variant, illustrated in FIG. 5, a series of frictional pads 138 are fixedly attached to the back surface 38 of the body 14 and serve to facilitate positioning the level 10 on the flat surface 114.

The final spirit level for the installation of tile and cabinets 10 has been described with reference to particular embodiments. Other modifications and enhancements can be made without departing from the spirit and scope of the claims that follow.

What is claimed is:

1. A spirit level for tile and cabinet installation, comprising:
    a rigid body, said body having a planar upper surface, a planar lower surface parallel to said upper surface, a first end, a second end, a front surface, a back surface and a first predetermined length;
    said upper and lower planar surfaces being separated by a first predetermined width;
    an auxiliary edge portion, said edge portion having a planar top surface and a planar bottom surface parallel to said top surface;
    said top and bottom planar surfaces being separated by a second predetermined width;
    means for removably attaching said auxiliary edge portion to the upper planar surface of said rigid body so that said upper planar surface and said planar top surface are in contact when said auxiliary edge portion is attached to said rigid body;
    at least one bubble vial, said vial being fixedly attached to said rigid body for indicating when said upper and lower planar surfaces are horizontally oriented; and
    means for removably securing said rigid body to a flat surface.

2. A spirit level for tile and cabinet installation as described in claim 1, wherein the means for removably attaching the auxiliary edge portion to the upper planar surface of the rigid body further comprises:

a groove, said groove being formed in the upper surface of the rigid body; and a mating tongue portion, said tongue portion extending downwardly from bottom surface of the auxiliary edge portion and being sized, shaped, and disposed to removably engage said groove so that the top surface of the auxiliary edge portion will be parallel to upper surface of the rigid body and the level will have a width equal to the sum of the first predetermined width and the second predetermined width.

3. A spirit level for tile and cabinet installation as described in claim 1, wherein the means for removably attaching the auxiliary edge portion to the upper planar surface of the rigid body further comprises:

a least one pin, said pin extending downwardly from the bottom surface of the auxiliary edge portion; and at least one mating orifice, said orifice penetrating the upper surface of the rigid body and being sized, shaped, and disposed to removably engage said pin so that the top surface of the auxiliary edge portion will be parallel to upper surface of the rigid body and the level will have a width equal to the sum of the first predetermined width and the second predetermined width.

4. A spirit level for tile and cabinet installation as described in claim 1, further comprising at least one bubble vial, said vial being fixedly attached to said rigid body for indicating when said upper and lower planar surfaces are vertically oriented.

5. A spirit level for tile and cabinet installation as described in claim 4, wherein said first end and second end include parallel planar end surfaces normal to said upper and lower planar surfaces.

6. A spirit level for tile and cabinet installation as described in claim 1 wherein the means for removably securing the rigid body to a flat surface further comprises:

a series of holes, said holes penetrating said rigid body perpendicular to a long axis of said level; and at least two of either nails and screws, said nails and screws being of sufficient length to pass though said holes in said rigid body and to secure said rigid body to said flat surface.

7. A spirit level for tile and cabinet installation as described in claim 6 wherein a series of holes is evenly spaced along said rigid body to facilitate removably attaching the level to the flat surface.

8. A spirit level for tile and cabinet installation as described in claim 1 further comprising a series of frictional pads, said pads being fixedly attached to the back surface of the body and serving to facilitate positioning said level on the flat surface.

* * * * *